(12) United States Patent
Li et al.

(10) Patent No.: US 10,197,798 B2
(45) Date of Patent: Feb. 5, 2019

(54) 3D PRINTER AND LENS MODULE USED BY SAME

(71) Applicant: HAN'S LASER TECHNOLOGY INDUSTRY GROUP CO., LTD., Shenzhen (CN)

(72) Inventors: Jiaying Li, Shenzhen (CN); Chaoming Zhou, Shenzhen (CN); Bo Sun, Shenzhen (CN); Yunfeng Gao, Shenzhen (CN)

(73) Assignee: HAN'S LASER TECHNOLOGY INDUSTRY GROUP CO., LTD., Shenzhen (CN)

( * ) Notice: Subject to any disclaimer, the term of this patent is extended or adjusted under 35 U.S.C. 154(b) by 143 days.

(21) Appl. No.: 15/517,944

(22) PCT Filed: Dec. 3, 2014

(86) PCT No.: PCT/CN2014/092961
§ 371 (c)(1),
(2) Date: Apr. 7, 2017

(87) PCT Pub. No.: WO2016/086376
PCT Pub. Date: Jun. 9, 2016

(65) Prior Publication Data
US 2017/0307877 A1 Oct. 26, 2017

(51) Int. Cl.
*G02B 9/12* (2006.01)
*G02B 27/00* (2006.01)
(Continued)

(52) U.S. Cl.
CPC ........ *G02B 27/0012* (2013.01); *B29C 64/264* (2017.08); *B29C 67/00* (2013.01);
(Continued)

(58) Field of Classification Search
CPC ... G02B 9/12; G02B 9/14; G02B 9/16; G02B 13/04
(Continued)

(56) References Cited

U.S. PATENT DOCUMENTS

2005/0057736 A1 3/2005 Tani
2011/0310493 A1 12/2011 Park et al.

FOREIGN PATENT DOCUMENTS

CN 1822935 8/2006
CN 101324697 A 12/2008
(Continued)

OTHER PUBLICATIONS

Zeying, Chi; Wenjian, Chen, 'Application of Optical and Optical Design', Publication Date: Nov. 30, 2008, pp. 81-89; Published in China.
(Continued)

*Primary Examiner* — William Choi
(74) *Attorney, Agent, or Firm* — Platinum Intellectual Property LLP (57) ABSTRACT

A lens module (50) and a 3D printer (100) comprising same. The lens module comprises a first lens (L1), a second lens (L2) and a third lens (L3) sequentially and coaxially arranged in the transmission direction of incident light. The first lens, the second lens and the third lens are all meniscus lenses. The first lens comprises a first curved surface (S1) and a second curved surface (S2). The second lens comprises a third curved surface (S3) and a fourth curved surface (S4). The third lens comprises a fifth curved surface (S5) and a sixth curved surface (S6). The first to the sixth curved surfaces are sequentially arranged in the transmission direction of the incident light, and the curvature radii of the first to the sixth curved surfaces are sequentially −200±5%, −100±5%, −80±5%, −150±5%, −100±5% and −70±5% in a
(Continued)

unit of millimeter. By means of the lens module, the printing efficiency of the 3D printer is high and it is convenient to carry out printing of ultra-large workpieces.

9 Claims, 6 Drawing Sheets

(51) Int. Cl.
    *B29C 67/00*     (2017.01)
    *B33Y 30/00*     (2015.01)
    *B33Y 40/00*     (2015.01)
    *B33Y 50/02*     (2015.01)
    *B29C 64/264*     (2017.01)
    *B29L 11/00*     (2006.01)

(52) U.S. Cl.
    CPC ............... *B33Y 30/00* (2014.12); *B33Y 40/00* (2014.12); *B33Y 50/02* (2014.12); *B29L 2011/0016* (2013.01)

(58) Field of Classification Search
    USPC ................................. 359/716, 753, 784, 785
    See application file for complete search history.

(56) References Cited

FOREIGN PATENT DOCUMENTS

| | | |
|---|---|---|
| CN | 201235608 Y | 5/2009 |
| CN | 102262283 A | 11/2011 |
| CN | 103341625 A | 10/2013 |
| CN | 203622599 U | 6/2014 |
| CN | 103984078 A | 8/2014 |
| CN | 104029394 A | 9/2014 |
| KR | 20040102531 A | 12/2004 |

OTHER PUBLICATIONS

Jianhua, MO, 'Manufacturing Technology of Liquid Resin by UV Curing'; Publication Date: Jun. 30, 2016; pp. 48-50; Published in China.

SIPO Office Action of the corresponding Chinese patent application, dated May 4, 2018.

3D PRINTER AND LENS MODULE USED BY SAME

FIELD OF THE INVENTION

The present disclosure relates to a laser processing system, and more particularly, relates to a 3D printer and a lens module adopted by the 3D printer.

BACKGROUND OF THE INVENTION

At present, the 3D printer can print various objects, such as the small jewelry element or the large 3D house. The conventional 3D printer is controlled by a computer to move along a track which is a profile of an element having a predetermined shape. The conventional 3D printer performs a scanning to a liquid photosensitive resin, point by point and layer by layer, by adopting the ultraviolet laser. The scanned liquid resin layer generates a photo-polymerization to solidify and form one cross-sectional layer of an element. The layer by layer scanning is repeated continuously until the whole element is manufactured completely. The 3D printer controls movements of a reflector and a lens module via a control mechanism, and thus a movement of a focal point of a light beam can be controlled to realize a point by point printing. However, the 3D printer has a slower printing speed and a relative lower efficiency, therefore, it is difficult to realize a printing of an ultra-large scale workpiece.

SUMMARY

Accordingly, it is necessary to provide a 3D printer and a lens module adopted by the 3D printer, which have a high printing efficiency.

A lens module includes successively and coaxially arranged along a transmission direction of incident light, a first lens being a meniscus lens and including first curved surface and a second curved surface; a second lens being a meniscus lens and including a third curved surface and a fourth curved surface; a third lens being a meniscus lens and including a fifth curved surface and a sixth curved surface; wherein the first curved surface to the sixth curved surface are successively arranged along the transmission direction of the incident light, radii of curvature of the first curved surface to the sixth curved surface are −200±5%, −100±5%, −80±5%, −150±5%, −100±5%, and −70±5%, respectively, with a unit of millimeter.

According to an embodiment, central thicknesses of the first lens to the third lend are 5±5%, 4±5%, and 3±5%, respectively, with a unit of millimeter.

According to an embodiment, the first lens has a ratio of refractive index to Abbe number of (1.62/56)±5%, the second lens has a ratio of refractive index to Abbe number of (1.60/45)±5%, and the third lens has a ratio of refractive index to Abbe number of (1.63/55)±5%.

According to an embodiment, a total length of the lens module is 30 millimeters, an external diameter of the lens module is less than or equal to 90 millimeters.

According to an embodiment, the lens module further includes a fourth lens located behind the third lens along the transmission direction of the incident light wherein the fourth lens is a flat lens.

According to an embodiment, the fourth lens is a protective lens having a central thickness of 5±5% millimeters, the fourth lens has a ratio of refractive index to Abbe number of (1.51/64)±5%.

According to an embodiment, the lens module has a focal length of 2200 millimeters, an entrance pupil diameter of 30 millimeters, and a processing wavelength of 1064 nanometers to 630 nanometers.

An 3D printer includes: successively arranged along a transmission direction of an incident light, a laser; a beam expander; a first vibrating mirror; a second vibrating mirror; a lens module mentioned above; and a molding platform; wherein the laser, the beam expander, and the first vibrating mirror are coaxially arranged, the second vibrating mirror is parallel to the first vibrating mirror, the second vibrating mirror, the lens module, and the molding platform are successively and coaxially arranged.

According to an embodiment, the 3D printer further includes a guiding bracket located adjacent the molding platform and a drawing member slidably mounted on the guiding bracket, wherein the molding platform defines a receiving groove, and an end of the drawing member is movably positioned in the receiving groove of the molding platform.

Due to the arrangements and parameter configuration of the three lens of the lens module, causing the lens module to obtain an extra-long focal length, thereby greatly improving a printing efficiency of the 3D printer, facilitating to perform a printing of an ultra-large scale workpiece.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION OF THE EMBODIMENTS

The above and other objects, features and advantages of the present invention will become more apparent by describing in detail with reference to the accompanying drawings. Although the invention is illustrated and described herein with reference to specific embodiments, the invention is not intended to be limited to the details shown. Rather, various modifications may be made in the details within the scope and range of equivalents of the claims and without departing from the invention It should be noted that the negative sign used herein means the ray propagates from left to right. Taking the intersection point of the spherical surface and the principal optical axis as a reference point, if the center of the spherical surface is in the left of the intersection point, the radius of curvature has a negative value, if, on the other hand, the center of the spherical surface is in the right of the intersection point, the radius of curvature has a positive value. In addition, in view of the ray propagating from left to right, one side on the left of the lens is referred as the object side, and the other side on the right of the lens is referred as the image side. The positive lens indicates that a central thickness of the lens is greater than that of a periphery of the lens, and the negative lens indicates that a central thickness of the lens is greater than that of a periphery of the lens.

Figure 1:
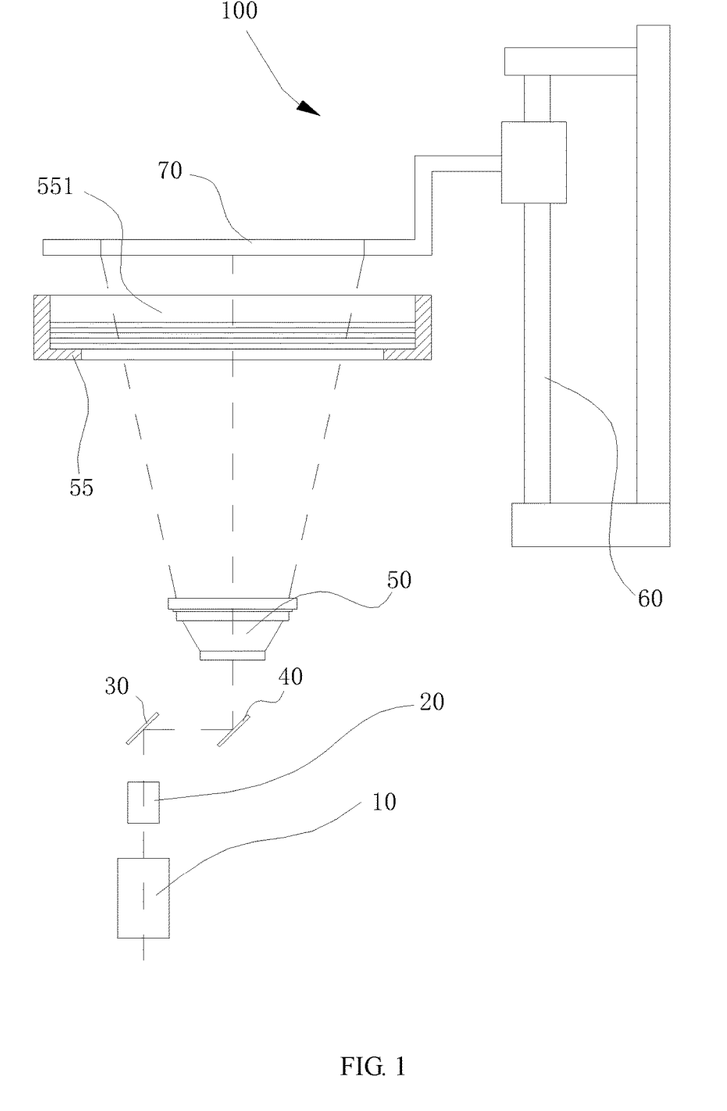
FIG. 1 is a schematic view of a 3D printer according to an embodiment.

Referring to FIG. 1, the 3D printer 100 according to an embodiment includes, successively arranged along a transmission direction of an incident light, a laser 10, a beam expander 20, a first vibrating mirror 30, a second vibrating mirror 40, a lens module 50, and a molding platform 55. The 3D printer 100 further includes a guiding bracket located adjacent the molding platform 55 and a drawing member 70 slidably mounted on the guiding bracket 60. The laser 10, the beam expander 20 and the first vibrating mirror 30 are coaxially arranged. The second vibrating mirror 40 is parallel to the first vibrating mirror 30. The second vibrating mirror 40, the lens module 50, and the molding platform 55 are successively and coaxially arranged, and the molding platform 55 is positioned above the lens module 50. In the illustrated embodiment, the molding platform 55 defines a receiving groove 551, the receiving groove 551 receives liquid curing agent therein for forming a workpiece. An end of the drawing member 70 is movably positioned in the receiving groove 551 of the molding platform 55. The first vibrating mirror 30 is an X vibrating mirror, the second vibrating mirror 40 is an Y vibrating mirror.

Figure 2:
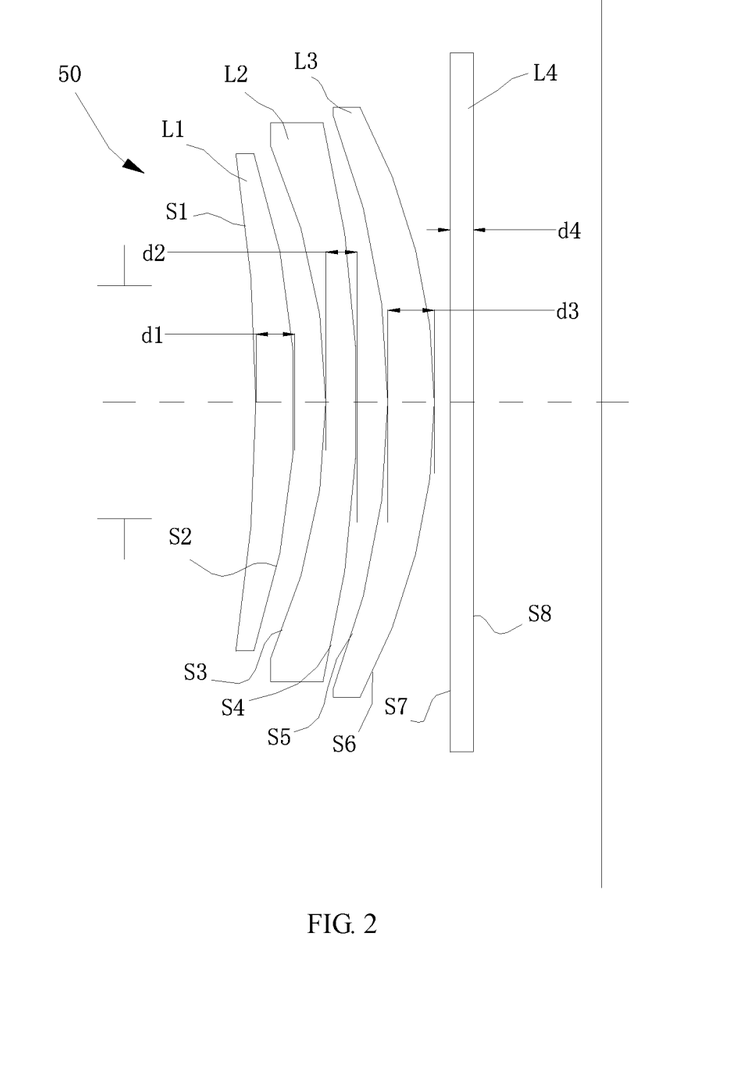
FIG. 2 is a schematic view of a lens module of the 3D printer of FIG. 1.

Referring to FIG. 2, a total length of the lens module 50 is 30 millimeters, a maximum external diameter is 90 millimeters. The lens module 50 includes, successively and coaxially arranged along the transmission direction of the incident light, a first lens L1, a second lens L2, a third lens L3, and a fourth lens L4. The first lens L1, the second lens L2, and the third lens L3 are all meniscus lenses. The fourth lens L4 is a flat lens. The first lens L1 includes a first curved surface S1 and a second curved surface S2. The second lens L2 includes a third curved surface S3 and a fourth curved surface S4. The third lens L3 includes a fifth curved surface S5 and a sixth curved surface S6. The fourth lens L4 includes a seventh curved surface S7 and an eighth curved surface S8. Opposite curved surfaces of each lens serve as a light incident surface and a light emergent surface, respectively. The first curved surface S1 to the eighth curved surface S8 are successively arranged along the transmission direction of the incident light. Convex directions of the first curved surface S1, the second curved surface S2, the third curved surface S3, the fourth curved surface S4, the fifth curved surface S5, and the sixth curved surface S6 are the same, and all are convex along the transmission direction of the incident light (i.e. are convex to the image side). The seventh surface S7 and the eighth surface S8 are flat surfaces. In the illustrated embodiment, the fourth lens L4 is a protective glass. It can be understood that, the fourth lens L4 can be omitted.

The first lens L1 has a ratio of refractive index to Abbe number of 1.62/56. The first curved surface S1 of the first lens L1 is convex to the image side, and has a radius of curvature of −200 millimeters. The second curved surface S2 is convex to the image side, and has a radius of curvature of −100 millimeters. The first lens L1 has a central thickness d1 (a thickness of the lens along an optical axis) of 5 millimeters. Aforementioned parameters of the first lens L1 have a tolerance range of 5%, i.e. aforementioned parameters can vary within a range of ±5%.

The second lens L2 has a ratio of refractive index to Abbe number of 1.60/45. The third curved surface S3 of the second lens L2 is convex to the image side, and has a radius of curvature of −80 millimeters. The fourth curved surface S4 is convex to the image side, and has a radius of curvature of −150 millimeters. The second lens L2 has a central thickness d2 of 4 millimeters. Aforementioned parameters of the second lens L2 have a tolerance range of 5%.

The third lens L3 has a ratio of refractive index to Abbe number of 1.63/55. The fifth curved surface S5 of the third lens L3 is convex to the image side, and has a radius of curvature of −100 millimeters. The sixth curved surface S6 is convex to the image side, and has a radius of curvature of −70 millimeters. The third lens L3 has a central thickness d3 of 5 millimeters. Aforementioned parameters of the third lens L3 have a tolerance range of 5%.

The fourth lens L4 has a ratio of refractive index to Abbe number of 1.51/64. Radius of curvature of the seventh curved surface S7 and the eighth surface S8 are ∞. The fourth lens L4 has a central thickness d4 of 3 millimeters. Aforementioned parameters of the fourth lens L4 have a tolerance range of 5%.

By means of aforementioned configuration, the optical parameters of the lens module 50 are following: a focal length of 2200 millimeters, an entrance pupil diameter of 30 millimeters, a visual field of 50 degrees, a processing wavelength of 1064 to 630 nanometers. The lens module 50 causes a size of the workpiece which is processed by the 3D printer 10 to be greater increased. When the workpiece is a cylinder, the workpiece has a volume V=Φ*L (L represents a length of the workpiece to be processed), the diameter Φ can have a maximum value of 2 meters. When a cross-section of the workpiece is a square, the workpiece has a volume V=S*L, the area S can have a maximum value of 1.4*1.4 square meters. The experimental test effect of the lens module 50 is shown as FIG. 3 through FIG. 6.

Figure 3:
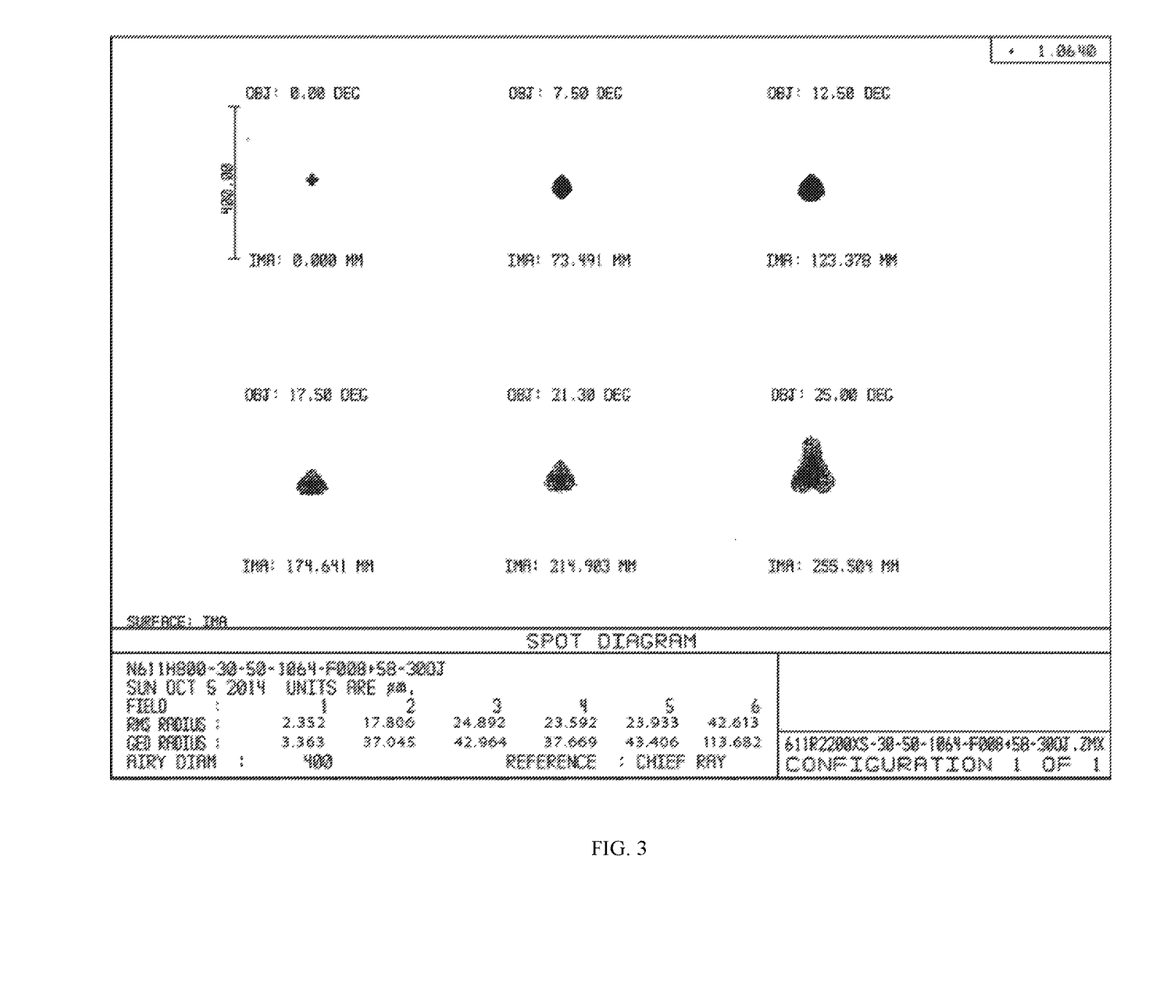
FIG. 3 is a graphic diagram showing geometrical aberration of the lens module of FIG. 2.

FIG. 3 is a graphic diagram showing geometrical aberration of the lens module 50, DBJ represents a visual angle, with a unit of degree. IMA represents an imaging diameter of the image surface, with a unit of millimeter. FIG. 3 shows a scale length of 400 millimeters. It can be seen from the spot diagram shown in FIG. 3 that, the diffusion range of the focusing spot of the lens module 50 is relative less, and reaches an ideal resolution, the geometrical spot in the full visual field are all no more than 0.04 millimeters.

Figure 4:
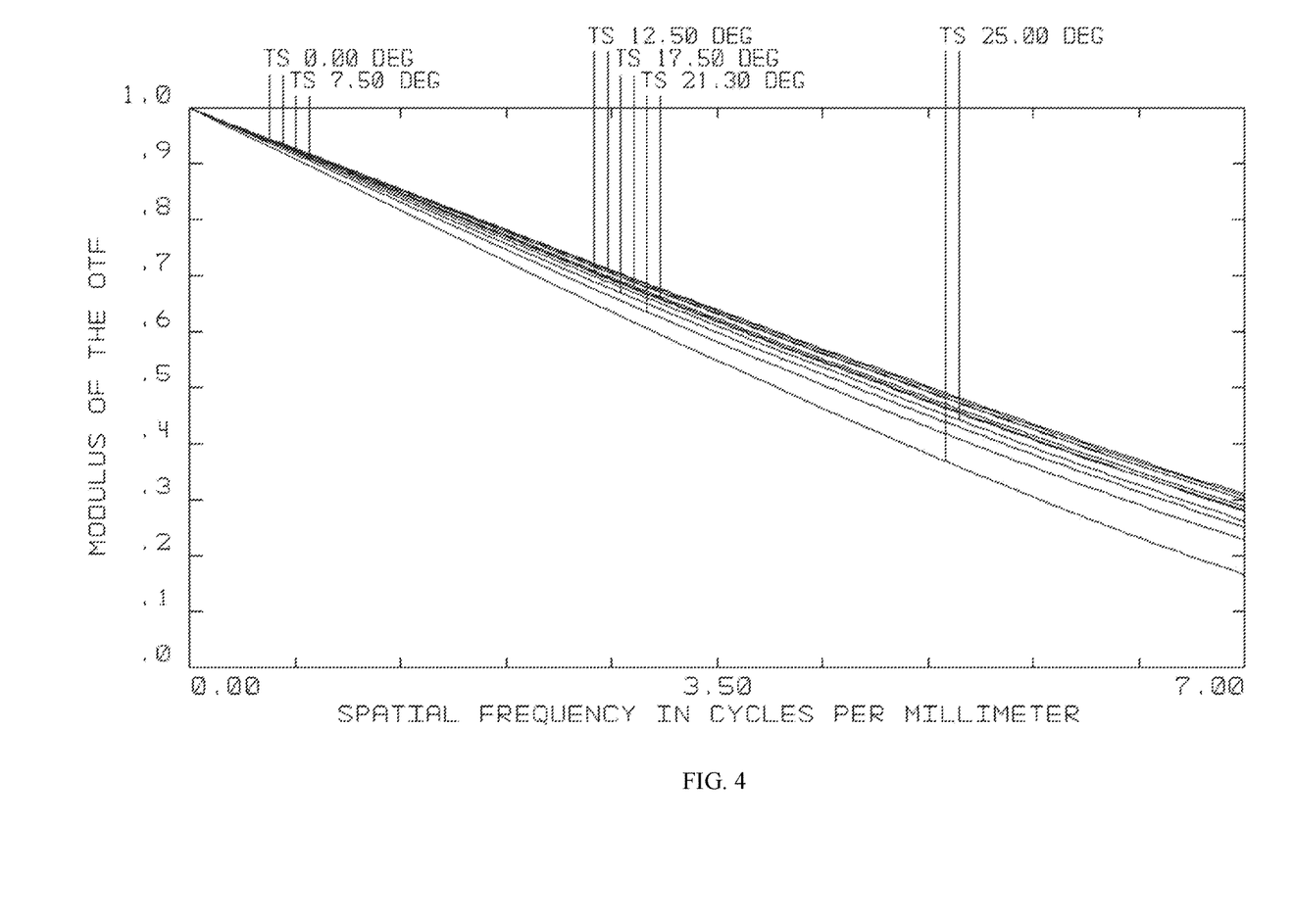
FIG. 4 is a graphic diagram showing a modulation transfer function M.T.F characteristic of the lens module of FIG. 2.

FIG. 4 is a graphic diagram showing modulation transfer function (M.T.F) characteristic of the lens module 50. The horizontal coordinate represents a resolution, with a unit of line pair per millimeter. TS represents an visual field, with a unit of degree. When the M.T.F is 0.3, there is also 7 line pairs per millimeter, which is equal to that the resolution is 0.07 millimeters, and reaches an ideal value.

Figure 5:
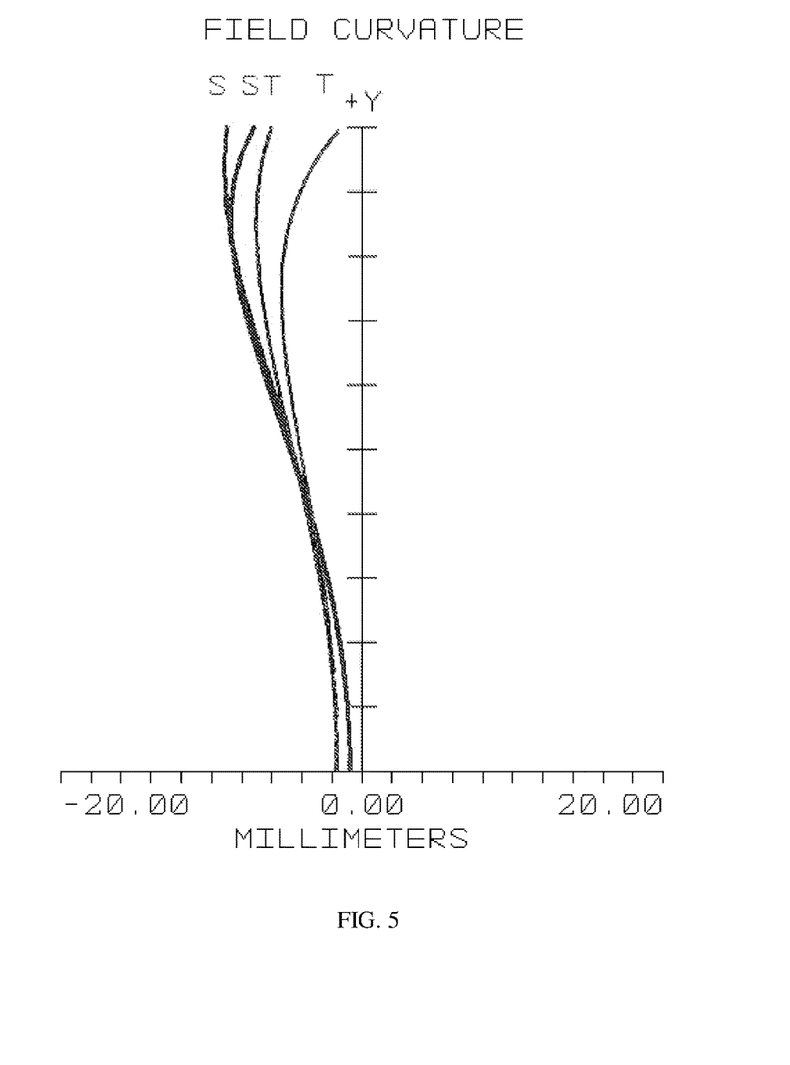
FIG. 5 is a graphic diagram showing astigmatism of the lens module of FIG. 2.
Figure 6:
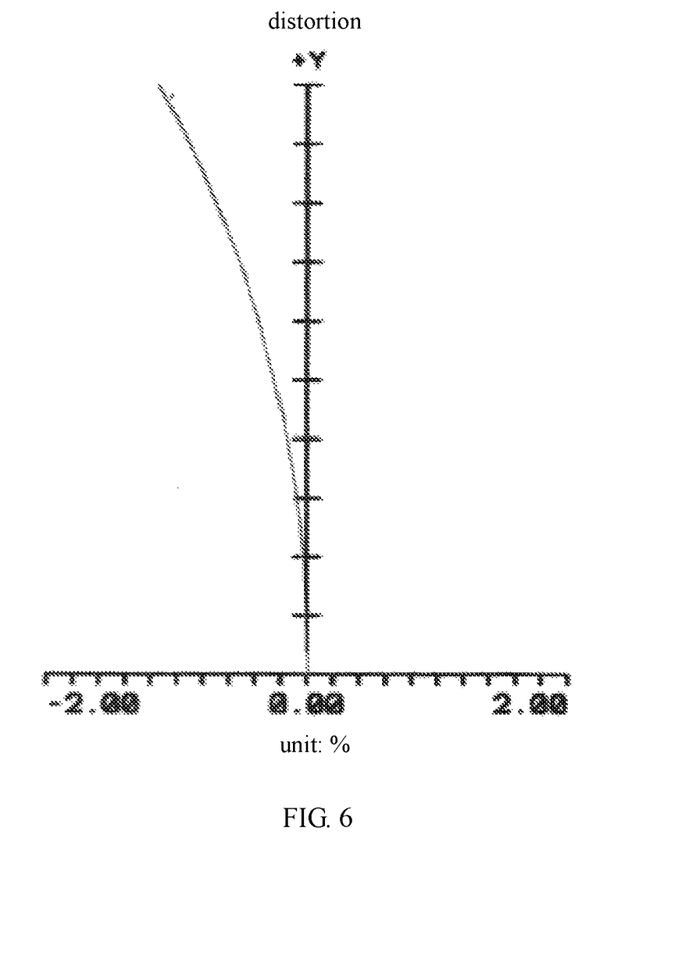
FIG. 6 is a graphic diagram showing distortion of the lens module of FIG. 2.

FIG. 5 is a graphic diagram showing astigmatism of the lens module 50 according to the embodiment of FIG. 1. The vertical coordinate +Y in FIG. 5 represents a value of the visual field, the unit of the horizontal coordinate is millimeter. FIG. 6 is a graphic diagram showing distortion of the lens module 50 according to the embodiment of FIG. 1. The vertical coordinate +Y in FIG. 6 represents a value of the visual field, the unit of the horizontal coordinate is a percentage. It can be seen from FIG. 5 and FIG. 6, the aberration of the lens module 50 falls within the focal length, thus the system can adopt 1064 nanometers as a processing wavelength, and adopt 630 nanometers (a visible light) as an optical length of a monitoring system. Apparently, the 630 nanometers can be adopted as the wavelengths of the processing system and the monitoring system, and its aberration is ideal.

Referring to FIG. 1, when the 3D printer 100 works, the laser beam is emitted from the laser 10, and reaches the first vibrating mirror 30 by passing the beam expander 20, the first vibrating mirror 30 reflects the laser beam to the second vibrating mirror 40, the second vibrating lens 40 reflects the laser beam to the lens module 50. The laser beam extends through the lens module 50 and is achromatic, and then reaches the molding platform 55 to cure the liquid curing agent in the receiving groove 551, thereby a cured layer having a predetermined shape is formed on the drawing member 70. During the process, the drawing member 70 lifts the cured layer continuously, the laser beam causes the liquid curing agent to continuously form another cured layer on the formed cured layer, thereby finally accomplishing a printing of the workpiece. The formed workpiece by printing includes a plurality of cured layers.

Due to the arrangements and parameter configuration of the first lens to the fourth lens of the lens module 50, the lens module 50 obtains an extra-long focal length, thereby improving a printing efficiency of the 3D printer 100, facilitating to perform a printing of an ultra-large scale workpiece. At the same time, the lens module 50 also achieves an achromatic effect, and the lens module 50 merely adopts four lens, and greatly simplifying the variety of optical materials.

In addition, because the 3D printer 100 adopts a first vibrating mirror 30 and a second vibrating mirror 40 which cause the laser beam to scan along the X axis and the Y axis, a deflection of the laser beam is achieved. The laser beam can move along a predetermined track, which greatly improve the printing speed. The 3D printer 100 can not only print various complicated profiles, but also print a workpiece having a complicated internal structure.

It can be understood that, when the liquid curing agent is replaced by a solid body, the laser 10, the beam expander 20, the first vibrating mirror 30, the second vibrating mirror 40, and the lens module 50 can be positioned above the molding platform 55, causing the transmission direction of the laser beam to be substantial downward. It can be understood, the molding platform 55 can have structures of other shape. When the 3D printer 100 is a printer of other type, the guiding bracket 60 and the drawing member 70 can be omitted.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

What is claimed is:

1. A lens module, comprising, successively and coaxially arranged along a transmission direction of incident light:
   a first lens being a meniscus lens and comprising first curved surface and a second curved surface;
   a second lens being a meniscus lens and comprising a third curved surface and a fourth curved surface; and
   a third lens being a meniscus lens and comprising a fifth curved surface and a sixth curved surface;
   wherein the first curved surface to the sixth curved surface are successively arranged along the transmission direction of the incident light, radii of curvature of the first curved surface to the sixth curved surface are −200±5%, −100±5%, −80±5%, −150±5%, −100±5%, and −70±5%, respectively, with a unit of millimeter.

2. The lens module according to claim 1, wherein central thicknesses of the first lens to the third lend are 5±5%, 4±5%, and 3±5%, respectively, with a unit of millimeter.

3. The lens module according to claim 1, wherein the first lens has a ratio of refractive index to Abbe number of (1.62/56)±5%, the second lens has a ratio of refractive index to Abbe number of (1.60/45)±5%, and the third lens has a ratio of refractive index to Abbe number of (1.63/55)±5%.

4. The lens module according to claim 1, wherein a total length of the lens module is 30 millimeters, an external diameter of the lens module is less than or equal to 90 millimeters.

5. The lens module according to claim 1, further comprising a fourth lens located behind the third lens along the transmission direction of the incident light, wherein the fourth lens is a flat lens.

6. The lens module according to claim 5, wherein the fourth lens is a protective lens having a central thickness of 5±5% millimeters, the fourth lens has a ratio of refractive index to Abbe number of (1.51/64)±5%.

7. The lens module according to claim 1, wherein the lens module has a focal length of 2200 millimeters, an entrance pupil diameter of 30 millimeters, and a processing wavelength of 1064 nanometers to 630 nanometers.

8. An 3D printer, comprising, successively arranged along a transmission direction of an incident light,
   a laser;
   a beam expander;
   a first vibrating mirror;
   a second vibrating mirror;
   a lens module according to claim 1; and
   a molding platform;
   wherein the laser, the beam expander, and the first vibrating mirror are coaxially arranged, the second vibrating mirror is parallel to the first vibrating mirror, the second vibrating mirror, the lens module, and the molding platform are successively and coaxially arranged.

9. The 3D printer according to claim 8, further comprising a guiding bracket located adjacent the molding platform and a drawing member slidably mounted on the guiding bracket, wherein the molding platform defines a receiving groove, and an end of the drawing member is movably positioned in the receiving groove of the molding platform.

* * * * *